(12) United States Patent
Nakamura

(10) Patent No.: US 9,321,463 B2
(45) Date of Patent: Apr. 26, 2016

(54) REGENERATIVE BRAKING APPARATUS FOR ELECTRIC VEHICLE

(71) Applicant: DENSO CORPORATION, Kariya, Aichi-pref. (JP)

(72) Inventor: Toshihiro Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/625,857

(22) Filed: Feb. 19, 2015

(65) Prior Publication Data

US 2015/0239474 A1    Aug. 27, 2015

(30) Foreign Application Priority Data

Feb. 26, 2014    (JP) .................................. 2014-35899

(51) Int. Cl.
| | | |
|---|---|---|
| B60W 30/18 | (2012.01) | |
| B60L 7/18 | (2006.01) | |
| B60L 11/18 | (2006.01) | |
| B60L 7/26 | (2006.01) | |
| B60K 31/00 | (2006.01) | |
| B60W 50/14 | (2012.01) | |
| B60W 10/192 | (2012.01) | |
| B60W 10/30 | (2006.01) | |

(52) U.S. Cl.
CPC .......... B60W 30/18127 (2013.01); B60K 31/00 (2013.01); B60L 7/18 (2013.01); B60L 7/26 (2013.01); B60L 11/187 (2013.01); B60L 11/1861 (2013.01); B60W 10/192 (2013.01); B60W 10/30 (2013.01); B60W 50/14 (2013.01)

(58) Field of Classification Search
CPC ..................... B60W 30/18127; B60W 10/184; B60W 10/192; B60W 10/30; B60W 50/14; B60W 50/146; B60L 7/00; B60L 7/18; B60L 7/24; B60L 7/26; B60L 11/1861; B60L 11/187; B60L 11/1874; B60L 11/1875
USPC ................. 180/65.31, 65.21, 65.275, 65.285, 180/65.29; 320/144, 150, 151; 165/42, 43
See application file for complete search history.

(56) References Cited

U.S. PATENT DOCUMENTS

| 7,380,586 B2 * | 6/2008 | Gawthrop ............... B60H 1/004 165/202 |
|---|---|---|
| 8,035,349 B2 * | 10/2011 | Lubawy .................... B60L 7/10 318/376 |

(Continued)

FOREIGN PATENT DOCUMENTS

| JP | H08-322107 A | 12/1996 |
|---|---|---|
| JP | 2005-039885 A | 2/2005 |
| JP | 2007-284011 A | 11/2007 |

*Primary Examiner* — John Walters
(74) *Attorney, Agent, or Firm* — Posz Law Group, PLC

(57) ABSTRACT

A regenerative braking apparatus has an inverter. The inverter uses the rotational energy of the wheels to let the motor generator generate electric power for the purpose of providing regenerative braking. The regenerative braking apparatus also includes a refrigeration cycle unit and a heating cycle unit. The refrigeration cycle unit compresses a refrigerant with the electric power of the battery in order to heat a heat exchanger. The heating cycle unit is a unit in which a medium heated by the heat exchanger flows to heat the battery. When the battery is in a fully charged state where the battery cannot be charged with regenerative electric power of the motor generator, the regenerative braking apparatus exercises electric power consumption control to force the refrigeration cycle unit and the heating cycle unit to consume the electric power of the battery.

7 Claims, 4 Drawing Sheets

(56) References Cited

U.S. PATENT DOCUMENTS

| | | | |
|---|---|---|---|
| 8,220,590 B2* | 7/2012 | Chen | B66B 1/302 187/290 |
| 8,322,474 B2* | 12/2012 | Uchiyama | B60L 7/24 180/65.21 |
| 8,786,260 B2* | 7/2014 | Takatsuji | B60L 3/0046 320/144 |
| 2010/0190603 A1 | 7/2010 | Uchiyama | |

* cited by examiner ns on an uphill or a downhill or a downhill. More specifically, the

REGENERATIVE BRAKING APPARATUS FOR ELECTRIC VEHICLE

CROSS REFERENCE TO RELATED APPLICATION

This application is based on Japanese Patent Application No. 2014-35899 filed on Feb. 26, 2014, the disclosure of which is incorporated herein by reference.

TECHNICAL FIELD

The disclosure described in this specification relates to a regenerative braking apparatus for an electric vehicle. More specifically, the disclosure relates to a regenerative braking apparatus for an electric vehicle that provides cruise control (constant-speed running control).

BACKGROUND

Patent Document 1: JP2009-22069A
Patent Document 2: JPH08-322107A

A regenerative braking technology (also referred to as a regenerative brake), which uses an electric motor-generator to generate electric power during braking and stores the electric power in a battery, is conventionally employed in a hybrid or electric vehicle described in Patent Document 1. Patent Document 1 describes a scheme for implementing a propulsion device that is used in a vehicle using a generator motor as a motive power source and is capable of preventing a battery from being overcharged, recovering energy efficiently, and reducing the wear of a mechanical brake.

As such being the case, when the vehicle is driven, the battery supplies electric power to the generator motor, which operates as a motor generator, and when the vehicle is braked, the generator motor, which operates as a generator, is used to store braking energy in the battery.

Further, a first thermoelectric conversion element connected to the generator motor uses the regenerative electric power of the generator motor to cool the generator motor. This reduces the copper loss and iron loss of the generator motor, thereby reducing electric power loss. Besides, the charging current for the battery is reduced to prevent an overcharge. Preventing the overcharge in the above manner decreases the dependence on the mechanical brake.

Furthermore, thermal energy arising from the electric power loss in the generator motor is recovered by the first thermoelectric conversion element. Moreover, thermal energy arising from battery charging/discharging can be recovered by a second thermoelectric conversion element to improve fuel efficiency. This increases the fuel efficiency and reduces the use of a friction brake.

A similar control scheme is applied to cruise control. When speed is reduced for constant-speed control, the above-mentioned regenerative braking technology is used to achieve speed reduction while recovering electric power.

However, regenerative braking cannot be applied while the battery is fully charged.

If the above situation occurs while cruise control is exercised, user-friendliness is impaired.

A heating/cooling system for optimizing the temperature of the battery already exists.

An invention disclosed in Patent Document 2 permits a vehicle to run in accordance with information supplied from a car navigation unit and prevents a battery from being over-discharged or overcharged even when the vehicle continuously runs on an uphill or a downhill. More specifically, the following configuration is employed in order to prevent the battery in a hybrid vehicle from being over-discharged or overcharged in accordance with information supplied from the car navigation unit even when the vehicle continuously runs on an uphill or a downhill.

A control section receives road information from the car navigation unit and calculates the energy required for running along a route from a current location to a destination. A generator output pattern is determined in accordance with the required running energy and with the charging capability of a generator. A target generator output is calculated in accordance with the generator output pattern and with a battery charge status. A target throttle opening and a target field current amount are calculated in such a manner that an actual generator output agrees with the target generator output. Further, a target throttle opening signal is output to a throttle actuator drive control section, and a target field current amount signal is output to a field winding current control section. In this manner, the output of the generator is controlled to maintain the battery charge status within a predetermined control range. As a result, a control schedule is organized in accordance with the road information from the car navigation unit. This makes it possible to avoid a situation where the battery is fully charged when regenerative braking can be applied.

The contents of the patent documents, which are enumerated as the conventional technologies, may be introduced or incorporated by reference for the explanation of technical elements described in this specification.

SUMMARY

According to the technology described in Patent Document 1, electric power derived from regeneration can be used by a thermoelectric element to cool a generator. However, it is anticipated that a method of cooling the generator to consume energy may be dependent on environmental conditions. For example, the generator may not be controlled at an optimal temperature in cold climates. Further, when a running schedule is organized in accordance with the information from the car navigation unit, the technology for preventing the battery from being over-discharged or overcharged is effective no matter whether the vehicle continuously runs on an uphill or a downhill. However, the effectiveness of the technology is limited due to the influence of road conditions. For example, if the vehicle continuously runs on an extremely long downhill, the battery is fully charged because regenerative braking is applied for a long period of time.

An object of the disclosure described in this specification is to provide a regenerative braking apparatus for an electric vehicle that is capable of increasing the opportunity for using regenerative braking.

Another object of the disclosure described in this specification is to provide a regenerative braking apparatus for an electric vehicle that is capable of minimizing a situation where the use of regenerative braking is limited.

Still another object of the disclosure described in this specification is to provide a regenerative braking apparatus for an electric vehicle that is capable of having a section for surely consuming regenerative energy (battery power) and of avoiding insufficiency of braking force due to regenerative braking caused by full charge under any environmental conditions or road conditions.

In order to achieve the above objects, the present disclosure employs the following technical means. According to an aspect of the present disclosure, there is provided a regenerative braking apparatus for an electric vehicle. The regenerative braking apparatus includes a motor generator, an inverter, a refrigeration cycle unit, a heating cycle unit, and a control unit. The motor generator drives wheels by using the electric power of a battery. The inverter uses the rotational energy of the wheels to let the motor generator generate electric power for the purpose of providing regenerative braking. The refrigeration cycle unit compresses a refrigerant with the electric power of the battery to heat a heat exchanger. The heating cycle unit is a unit in which a medium heated by the heat exchanger flows to heat the battery for temperature adjustment purposes. The control unit controls the refrigeration cycle unit, the heating cycle unit, and the inverter.

The control unit includes an electric power consumption control section which forces the refrigeration cycle unit and the heating cycle unit to consume the electric power of the battery in a situation where the battery cannot be charged with regenerative electric power of the motor generator.

When the battery is in a charged state close to a fully charged state in which the battery cannot be charged with the regenerative electric power, the control unit forces the refrigeration cycle unit and the heating cycle unit to consume the electric power of the battery in a predetermined pattern. Therefore, the electric power can be precisely consumed to obtain regenerative braking force without regard to environment or running status. This reduces the possibility of required regenerative braking being unavailable.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
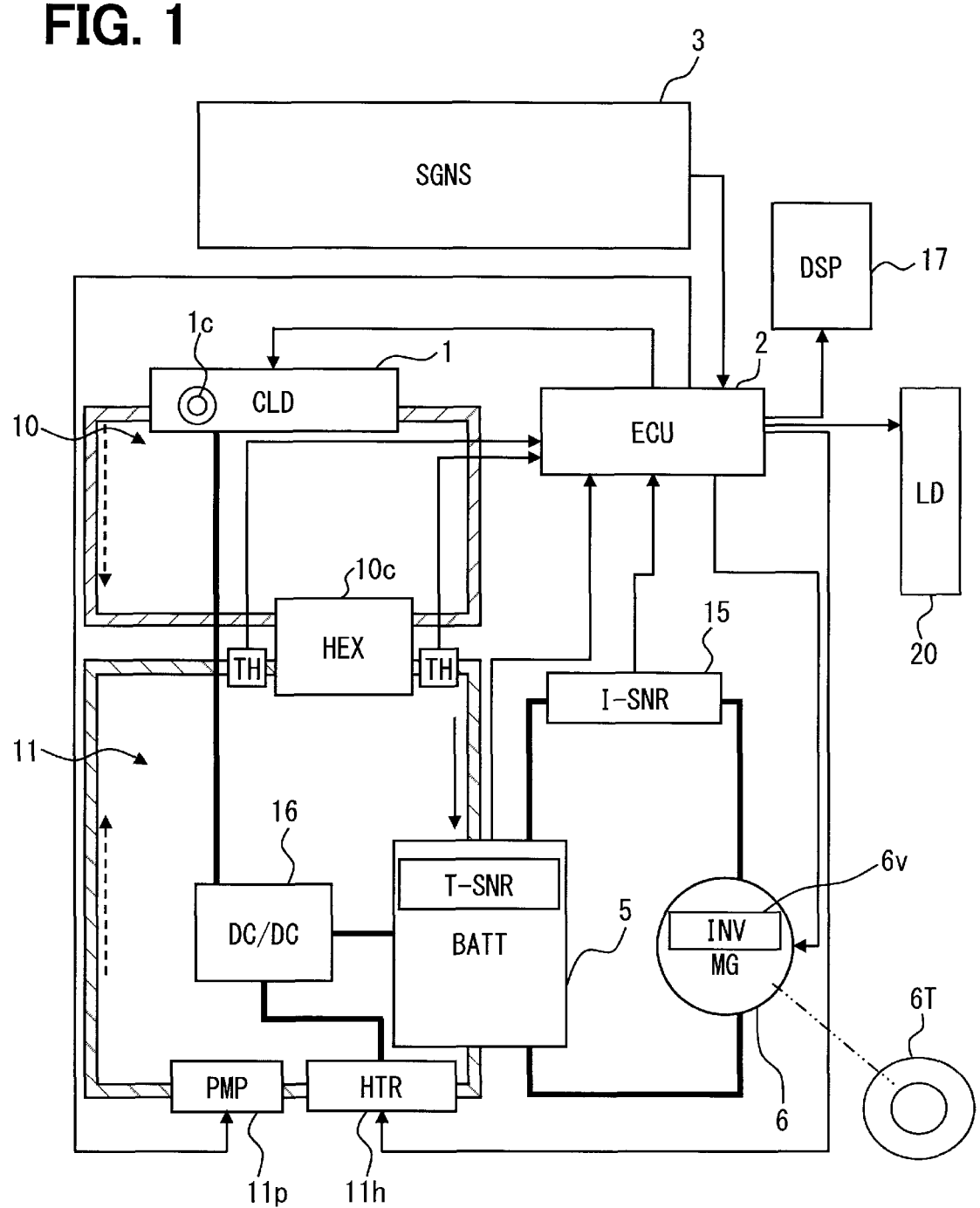
FIG. 1 is a block diagram illustrating a configuration of a regenerative braking apparatus for an electric vehicle in accordance with a first embodiment.

A plurality of embodiments implementing the disclosure described in this specification will now be described with reference to the accompanying drawings. Elements that are included in a certain embodiment and equivalent to those described in conjunction with a preceding embodiment are designated by the same reference numerals and may not be redundantly described. When some elements are described in conjunction with a certain embodiment, a preceding embodiment described earlier may be applied to the remaining elements.

In addition to combinable elements that are explicitly defined in the description of a certain embodiment to be combinable, some elements in one embodiment may be combined with some elements in another embodiment as far as their combination causes no particular problem.

First Embodiment

A first embodiment will now be described in detail with reference to FIGS. 1 to 4. FIG. 1 shows a configuration of a regenerative braking apparatus (system) for an electric vehicle that implements the present disclosure.

First of all, the first embodiment is outlined below. The electric vehicle does not include an engine that is formed of an internal combustion engine. A cooling device (CLD) 1 may double as a device that air-conditions the interior of a vehicle. In the present embodiment, however, the cooling device (CLD) 1 forms a dedicated refrigeration cycle unit 10.

In the present embodiment, a heating cycle unit 11 is operated to heat a battery (BATT) 5 for temperature control purposes. In this manner, control is exercised to consume electric power while the battery 5 is maintained at an optimal temperature. A heating unit (electric heater) for heating the battery 5 is incorporated to obtain the output of the battery 5. When the battery 5 is fully charged or in a charged state close to a fully charged state, the heating cycle unit 11, which heats the battery by using electric power derived from regenerative braking, and a heating device 11h, which heats a medium in the heating cycle unit 11, are positively operated to enter an energy consumption mode. Electric power of the battery 5 is consumed in the above manner.

For example, if the battery 5 is not fully charged, the system maintains the battery 5 at the optimal temperature. Thus, the heating cycle unit 11 is operated at a minimum required level (for example, at 2 kW). If, on the other hand, the battery 5 is fully charged, the system operates the heating cycle unit 11 and the refrigeration cycle unit 10 while maintaining the battery 5 within an optimal temperature range.

When control is exercised as described above, it is possible to obtain a section which controls components to consume regenerative energy (battery power) under any environmental conditions or road conditions. As a result, the insufficiency of regenerative braking force, which may be caused by full charge, can be avoided to reduce the possibility of impairing user-friendliness. If the regenerative braking force is insufficient, the user-friendliness may be impaired so that acceleration is induced despite the intention of a user, and that a mechanical brake has to be applied an increased number of times, and further that cruise control is canceled.

Further, if the electric power to be consumed to obtain required braking force is not available, a buzzer or other indicator is activated to inform the user that cruise control may be canceled. This makes it possible to predict acceleration during cruise control and take care to avoid a rear-end vehicle accident.

If braking force is not available during hill running, acceleration occurs so that cruise control cannot be exercised. Such termination of cruise control can be avoided.

When an electric brake is forcibly applied in a mechanical manner, brake shoes wear. Therefore, great merit is acquired when the insufficiency of braking force due to regenerative braking is avoided wherever possible to reduce the possibility of impairing user-friendliness.

The refrigeration cycle unit 10 shown in FIG. 1 provides an air conditioning cycle. The cooling device 1 controls the rotation speed of an internal electric compressor 1c in accordance with a drive instruction from a control unit (ECU) 2 and compresses a refrigerant (high-temperature and high-pressure) to let it circulate in a refrigeration cycle.

The electric vehicle does not include an engine that is formed of an internal combustion engine to generate a high-temperature engine temperature control fluid. In other words, the electric vehicle may be a hybrid vehicle, but cannot utilize the temperature of the high-temperature engine temperature control fluid.

Referring to FIG. 1, the control unit 2 controls the cooling device 1. Cold derived from the cooling device 1 may be used for air conditioning purposes or used as a dedicated cycle. A control system includes a signal source (SGNS) 3. The signal source 3 inputs vehicle information to the control unit 2. The signal source 3 includes various sensors and switches in the electric vehicle. The vehicle information includes information about the amount of accelerator pedal depression, information about the manipulation of a cruise control switch, information about the amount of brake pedal depression, a current vehicle speed, a target value for constant-speed running, the position of a shift lever, and outside air temperature.

The battery 5 rotates a motor generator (MG) 6, thereby driving wheels 6T. An inverter 6v (INV) is integral with the motor generator 6 and used to convert the DC power of the battery 5 to three-phase AC power having an arbitrary voltage and frequency.

The phase rotation speed (frequency) of the three-phase AC power supplied to a field winding of the motor generator 6 is controlled in real time by the control unit 2. For example, if the phase rotation speed is higher than a current rotation speed, that is, higher than the rotation speed of the motor generator 6 driven by the wheels 6T, the motor generator 6 acts as an electric motor. In this instance, the electric energy of the battery 5 is supplied to the motor generator 6, which then drives the wheels 6T.

If, on the other hand, the phase rotation speed is lower than the rotation speed of the motor generator 6 driven by the wheels 6T, the motor generator 6 acts as a generator to generate regenerative electric power, thereby applying a regenerative brake. In this instance, mechanical energy given to the motor generator 6, which is driven by the wheels 6T, generates electric energy. The generated electric energy is then converted to DC power by the inverter 6v and used to charge the battery 5.

When the battery 5 is not fully charged (this state is referred to as the normal state), the control unit 2 controls how the refrigeration cycle unit (air conditioning cycle) 10 heats the heating cycle unit 11. The refrigeration cycle unit 10 is of a well-known type that permits the electric compressor 1c in the cooling device 1 to compress the refrigerant and uses a heat exchanger (HEX) 10c, which doubles as a condenser, to let the compressed refrigerant dissipate heat for the purpose of generating heat.

More specifically, the refrigeration cycle unit 10 can heat a temperature control fluid, which is a medium in the heating cycle unit 11, through the heat exchanger 10c. This permits the electric compressor 1c to consume the electric power of the battery 5.

Consequently, when the battery 5 is fully charged or in a charged state close to the fully charged state and regenerative braking is not available, the refrigeration cycle unit 10 consumes the electric energy of the battery 5. In other words, the temperature control fluid in the heating cycle unit 11 is heated through the heat exchanger 10c. The heating cycle unit 11 in which the temperature control fluid flows includes the heat exchanger 10c, a temperature sensor TH, the battery 5, the heating device (HTR) 11h, and a pump (PMP) 11p. The heating device (HTR) 11h is formed of an electric heater for heating the temperature control fluid when its temperature is low.

The heating device 11h is a heater that heats the temperature control fluid to consume the electric energy in accordance with the drive instruction from the control unit 2. The pump 11p is an electric water pump that circulates the temperature control fluid in accordance with the drive instruction from the control unit 2.

When the battery 5 is discharged, the inverter 6v in the motor generator 6 causes the motor generator 6 to generate three-phase AC power. This drives the motor generator 6, thereby driving the wheels 6T of the vehicle. Further, when the vehicle is running, for instance, on a hill, the rotational energy of the wheels 6T rotates the motor generator 6, thereby allowing the motor generator 6 to operate as a generator. This generates regenerative electric power to charge the battery 5. This charging process cannot be performed while the battery 5 is fully charged.

FIG. 1 shows the control system. In the control system, the control unit (ECU) is an electronic control unit. The control unit includes at least one arithmetic processing unit (CPU) and at least one memory unit that acts as a storage medium for storing a program and data. The control unit is implemented by a microcomputer that includes a computer-readable storage medium. The storage medium may be provided by a non-transitory tangible media which stores the program that is computer-readable. The storage medium may be implemented, for example, by a semiconductor memory or a magnetic disc. The control unit may be implemented by one computer or by a set of computer resources linked by a data communication unit. When executed by the control unit, the program causes the control unit to function as a unit described in this specification and execute a method described in this specification. The control unit offers various elements. At least some of the elements may be referred to as a means for executing a function. In another respect, at least some of the elements may be referred to as a block interpreted as a component or a section interpreted as a component.

Means and/or functions provided by the control unit may be implemented by software recorded in a substantive memory unit and a computer executing the software, by software only, by hardware only, or by a combination of these. When, for instance, the control unit is implemented by an electronic circuit, which is hardware, it may be provided by a digital circuit containing many logic circuits or by an analog circuit.

The control system includes a plurality of signal sources exemplified in conjunction with the present embodiment. The signal sources are provided by sensors or by the control unit. Signals supplied from the signal sources are input to the control unit through an independent signal line or through a LAN or other data circuit. The control unit acquires information by storing the information represented by the signals in the memory unit. The control system uses the control unit to perform a control process exemplified in conjunction with the present embodiment. The control system performs the control process to exercise control so that a requested behavior is exhibited by one or more controlled targets exemplified in conjunction with the present embodiment.

Figure 2:
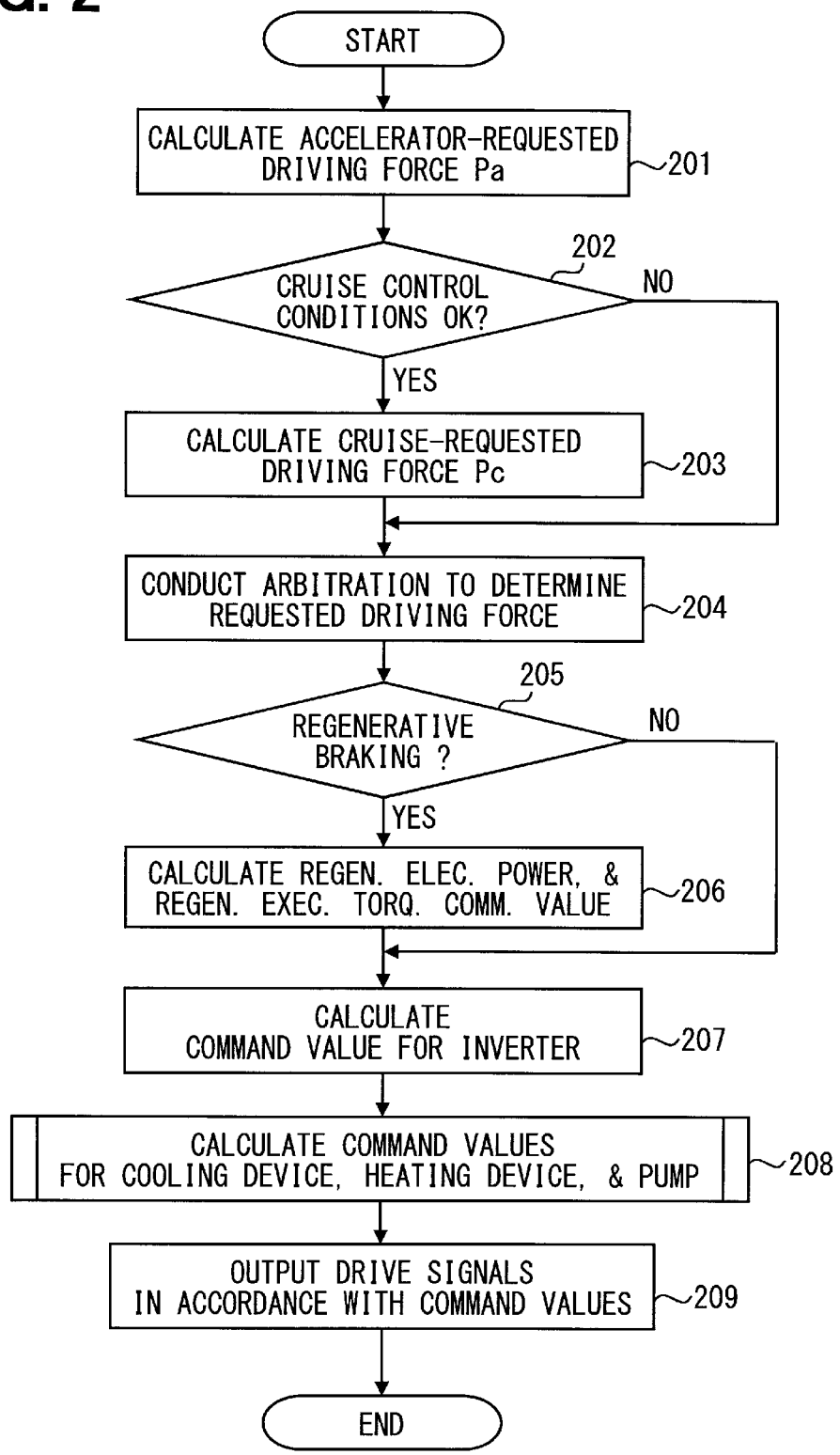
FIG. 2 is a flowchart illustrating basic control provided by a control unit according to the first embodiment.

FIG. 2 is a basic flowchart illustrating the control unit 2 in the above-described system. More specifically, FIG. 2 shows a main flow for driving force calculation and drive signal output.

When control is initiated, the driving force requested by an accelerator is calculated in step S201. For this calculation, a map is used as a function of the amount of accelerator pedal depression. Next, step S202 is performed to determine whether cruise control execution conditions are established. Cruise control is initiated when the query in step S202 is answered "YES", that is, the cruise control switch is manipulated and conditions for constant-speed running are met. Cruise control, namely, constant-speed running control, is well known. While cruise control is being exercised, step S203 is performed to determine the deviation between a current vehicle speed and a vehicle speed predetermined as a target value for cruise control in order to maintain the predetermined vehicle speed and calculate a cruise-requested driving force Pc, which is to be output from the motor generator 6 in accordance with a function of the deviation and with a control map.

Step S201 is performed in accordance with the amount of accelerator pedal depression by the user to calculate the power (N/m) to be generated by the vehicle. Here, a requested driving force is calculated to determine the amount of power required for the vehicle. However, when cruise control is initiated, step S203 is performed to calculate the amount of power required to attain a target vehicle speed for cruise control.

In other words, step S203 is performed to calculate the cruise-requested driving force Pc. While cruise control is being exercised, the cruise-requested driving force Pc is determined as a function of the deviation between the current vehicle speed and the predetermined vehicle speed in order to maintain the predetermined vehicle speed.

Next, arbitration is conducted in step S204 to determine the requested driving force. More specifically, arbitration is performed in step S204 between an accelerator-requested driving force Pa and the cruise-requested driving force Pc to calculate a final driver-requested driving force. Here, the arbitration is performed to determine which of two different driving forces is to be employed. While cruise control is selected, the cruise-requested driving force Pc is employed. If cruise control is not selected, the accelerator-requested driving force Pa is employed because it is requested by the driver.

Next, step S205 is performed to determine whether regenerative braking can be applied. More specifically, whether regenerative braking is to be applied is determined in accordance with the activation of a brake switch (a brake pedal is depressed) and with the cruise-requested driving force Pc. When the brake pedal is depressed, regenerative braking is generally applied. However, if the cruise-requested driving force Pc is much greater than a current diving force due, for instance, to uphill running, regenerative braking is not applied.

When regenerative braking is to be applied, step S206 is performed to calculate a regeneration execution torque and regenerative electric power in accordance with the amount of brake pedal depression and with the rotation speed of the wheels 6T. When a torque command value for the inverter is to be calculated from the calculated regeneration execution torque and regenerative electric power, unit conversion is performed. The regenerative electric power is expressed in watts (W). The regeneration execution torque $\tau$ is a function of the prevailing rotation speed $\omega$ and regenerative electric power P ($P=\tau\omega$)).

When it is determined that the motor generator 6 can be operated as a generator to obtain regenerative electric power as the battery 5 is not fully charged, a command value for the regeneration execution torque is calculated in step S206 to calculate the regenerative electric power. This calculation is performed with a map by using, for example, the current vehicle speed, the deviation from a target value for constant-speed running, the information about a hill, and the electric power remaining in the battery 5 as functions. The command value for the regeneration execution torque is used to determine the level of regenerative braking to be applied.

Next, step S207 is performed to calculate the command value for the inverter 6v in accordance with the command value for the regeneration execution torque and with the calculated regenerative electric power. In accordance with the calculated command value, the inverter 6v adjusts the electric power generated by the motor generator 6, which is driven by the wheels 6T.

The amount of braking force derived from regeneration is calculated in accordance with an input limit value (in watts) for the battery. Further, it can be determined by using a map in accordance with the current rotation speed of the wheels, the SOC of the battery, the maximum input power for the battery 5 (a function of battery temperature), and the upper limit for the regenerative electric power. Next, a command value (execution torque) for the inverter 5v is calculated from the calculated driving force (step S207).

Next, step S208 is performed to calculate command values for the heating device 11h and pump 11p of the heating cycle unit 11. Here, control values for the electric compressor 1c in the cooling device 1, the heating device 11h, and the pump 11p are calculated in such a manner as to optimize the temperature of the temperature control fluid flowing in the battery 5. The control values are determined by using a map in accordance, for instance, with the temperature of the battery 5, the current temperature of the temperature control fluid, and the deviation between an ideal temperature range of the battery 5 and the current temperature of the battery 5.

Finally, in step S209, the calculated control values are output as drive signals for the controlled devices. As described above, the amount of braking force derived from regeneration of the motor generator 6 is controlled during cruise control to optimize the temperature of the temperature control fluid flowing in the battery 5.

Figure 3:
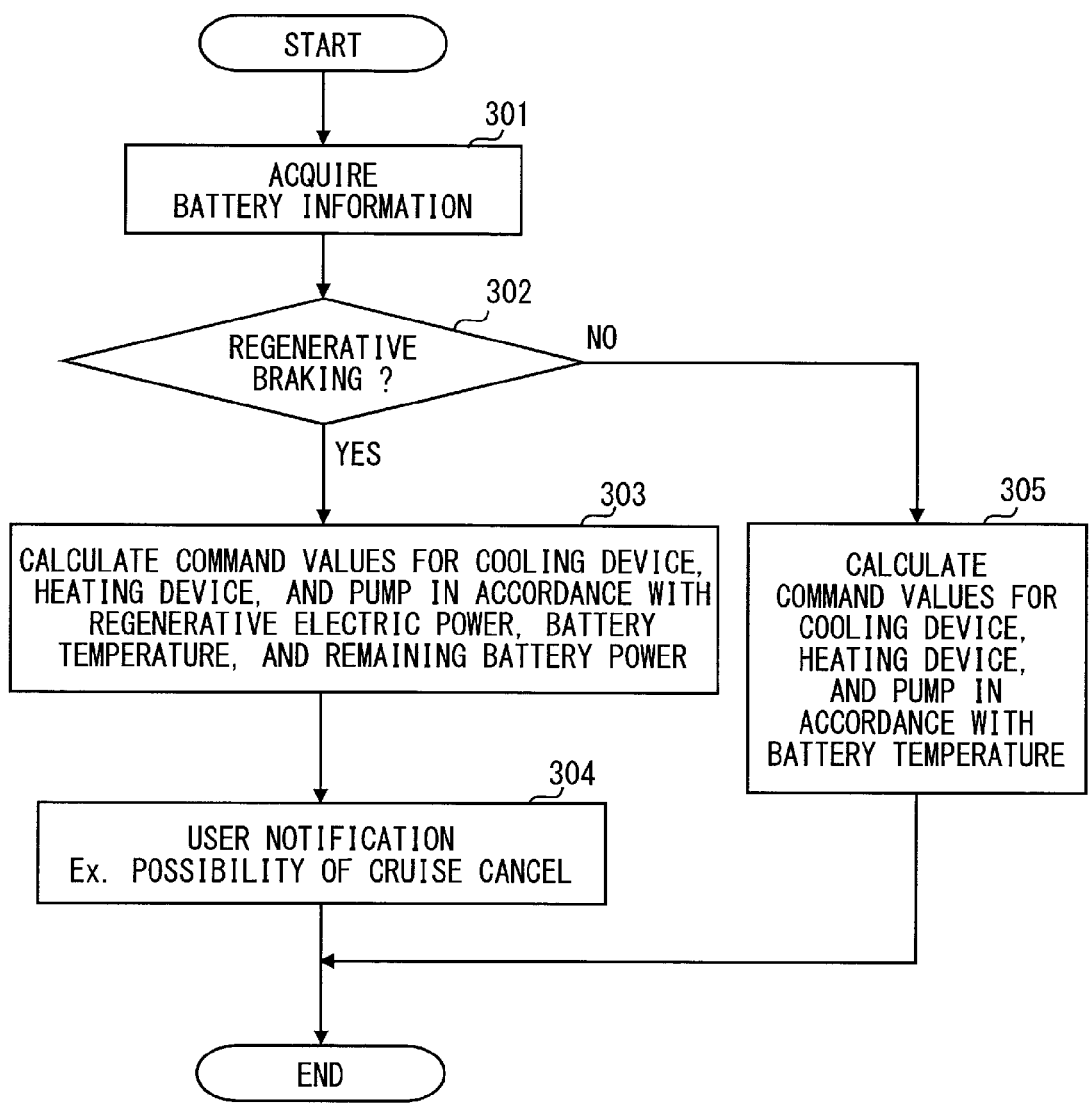
FIG. 3 is a flowchart illustrating how power consumption is controlled by the control unit according to the first embodiment.

How the heating cycle unit 11 shown in FIG. 1 is controlled for regenerative braking will now be described with reference to FIG. 3. Referring to FIG. 3, when control is initiated, the information about the battery 5 is acquired in step S301. More specifically, step S301 is performed to acquire values indicative of the temperature, voltage, and SOC of the battery 5.

The SOC (State Of Charge) of the battery denotes the amount of remaining battery power. More specifically, the SOC of the battery indicates the currently remaining battery power, which is expressed as a percentage on the presumption that the fully charged state is expressed as 100%. If the remaining battery power is half the amount of charge stored in the fully charged state, it is expressed as 50%. Step S302 is performed to determine whether the battery 5 is in a state other than the fully charged state to permit the use of regenerative electric power. If it is determined that the battery 5 can be charged with the regenerative electric power, processing proceeds to step S303. In step S303, the command values for the electric compressor 1c in the cooling device 1, the heating device 11h, and the pump 11p are calculated in accordance with the electric power derived from regenerative braking (regenerative electric power), the temperature of the battery 5, and the SOC of the battery 5. If regenerative braking is not to be applied, processing proceeds to step S305, which implements an electric power consumption control section. In step S305, the command values for the electric compressor 1c in the cooling device 1, the heating device 11h, and the pump 11p are calculated in accordance with the temperature of the battery 5.

Figure 4:
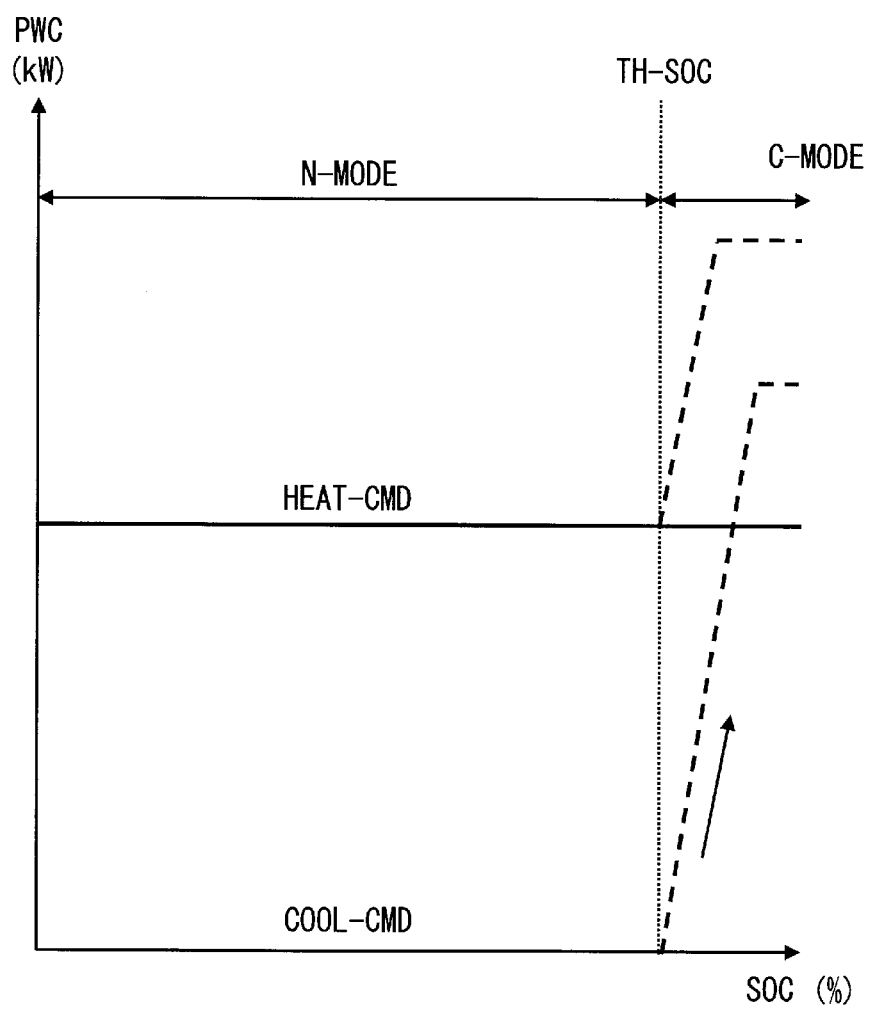
FIG. 4 is a graph illustrating an example of control provided in accordance with the embodiment described in FIG. 3.

FIG. 4 shows an example of calculating the command values for the electric compressor 1c in the cooling device 1, the heating device 11h, and the pump 11p. More specifically, FIG. 4 shows an example of a control map that is used when the current temperature of the battery 5 is 30° C. in a situation where its optimal temperature is 35° C. As the optimal temperature is 35° C. and the current temperature is 30° C., it is preferred that the temperature of the temperature control fluid be increased by 5° C.

In FIG. 4, the horizontal axis represents the SOC of the battery, which indicates the amount of remaining battery power, and the vertical axis represents the power consumption (PWC). When the battery 5 is not fully charged, a normal mode (N-MODE) is selected. In the normal mode, the regenerative electric power is used to charge the battery 5 and control the temperature of the battery 5, that is, control the temperature of the temperature control fluid in the heating cycle unit 11. As the temperature needs to be increased by 5° C., the electric compressor 1c in the cooling device 1 needs to be controlled in order to increase the temperature of the temperature control fluid in the heating cycle unit 11 shown in FIG. 1. It is also necessary to apply electric power to the heating device 11h, which is formed of an electric heater, in order to let the heating device 11h increase the temperature of the temperature control fluid in the heating cycle unit 11.

Broken lines in FIG. 4 indicate a heating command value (HEAT-CMD) for the heating device 11h and a cooling command value (COOL-CMD) for the cooling device 1, which are used in an energy consumption mode (C-MODE). The broken lines represent a waveform that prevails when regenerative braking is applied. Solid lines in FIG. 4 represent a waveform that prevails when regenerative braking is not applied. A broken-line graph indicates a forced increase.

FIG. 4 shows a threshold value TH-SOC that is used to check the level of SOC for the purpose of switching between the normal mode and the energy consumption mode. The threshold value TH-SOC represents a highly charged state in which the battery 5 cannot be charged with electric power derived from regenerative braking. As the threshold value TH-SOC indicates a level at which the battery 5 cannot accept the electric power derived from regeneration, it may be referred to as a full charge.

The amount of electric power derived from regenerative braking varies with the running speed of the vehicle and with the period during which regenerative braking is applied continuously or intermittently. Meanwhile, the state of charge SOC of the battery 5 indicates the amount of electric power that can be additionally charged to the battery 5. Further, part of electric power derived from regenerative braking may be instantly consumed by electrical loads on the vehicle. The threshold value TH-SOC is set in consideration of such electric power supply-and-demand balance in the vehicle. For example, the threshold value TH-SOC is set in consideration of a relatively high running speed at which cruise control is readily exercised, an average frequency of regenerative braking required for maintaining a constant speed, and the amount of charge required for the battery 5.

In the present embodiment, temperature control equipment for adjusting the temperature of the battery 5 is placed under the control of the control unit 2. The temperature control equipment includes the heating device 11h and the cooling device 1. The control unit 2 uses the temperature control equipment to adjust the amount of charge in the battery 5. In some cases, therefore, the threshold value TH-SOC may be set in consideration of the amount of power consumed by such controllable electrical loads.

If the battery 5 cannot be charged with regenerative electric power because the battery 5 is in a fully charged state or in a highly charged state close to the fully charged state, the command value for the heating device 11h and the command value for the electric compressor 1c in the cooling device 1 are increased in a predetermined pattern as shown in FIG. 4. Control is then exercised so that electric power is consumed by the heating device 11h and by the electric compressor 1c in the cooling device 1. This ensures that the regenerative electric power is consumed. As a result, the motor generator 6 can apply regenerative braking. Further, even if the driver does not apply the mechanical brake, which causes friction shoes of the brake to wear, the braking force is generated by regenerative braking. Moreover, the battery 5 can be charged to consume the electric power, which can also be consumed by the heating device 11h and by the cooling device 1. During cruise control, the driver does not have to apply the mechanical brake. Thus, cruise control is not automatically canceled. As described above, FIG. 4 shows an example of a command value map for the cooling device 1, the heating device 11h, and the like.

FIG. 4 shows a case where the battery needs to be warmed. The command value for the cooling device 1 is increased at a certain gradient for a predetermined period of time and then flattened. The command value for the heating device 11h is increased at a certain gradient for a predetermined period of time. These map values are set after each vehicle model has been subjected to conformance testing. The map values are then used to ensure that the electric power is optimally consumed.

Referring to FIG. 3, if it is determined in step S302 that regenerative braking is not to be applied, the command values for the cooling device 1, the heating device 11h, and the pump lip are calculated in accordance with the current temperature of the battery 5. For example, when the optimal temperature and the current temperature are assumed to be 35° C. and 30° C., respectively, the map is used to calculate the command values in such a manner as to increase the temperature by 5° C. The map to be used is a map for the employed vehicle model that is derived from experiments conducted in advance.

When regenerative braking is to be applied, charging the battery 5 with regenerative electric power takes precedence over heating the temperature control fluid in the heating cycle unit 11. In this manner, part of the regenerative electric power is used to adjust the temperature of the battery 5. In most cases, the optimal temperature of the battery 5 is approximately 35° C. Therefore, the temperature control fluid is often heated. However, the heat exchanger 10c formed of an evaporator from which the refrigerant evaporates can be used so that cold generated from the evaporator is given to the temperature control fluid flowing in the battery 5 in order to cool the temperature control fluid.

In the above-described embodiment, vehicle information, such as the information about an accelerator pedal, a cruise switch, a brake switch, a vehicle speed, and a shift lever input, is directly input to the regenerative braking apparatus for an electric vehicle. The shift lever input is used to calculate the regenerative electric power. Meanwhile, information about the battery 5, such as information about a voltage value, a battery temperature, a temperature control fluid temperature, and an electric current value, is directly input to the control unit. Further, in accordance with the cruise switch and running status, the control unit determines an operating mode and outputs drive signals to various devices.

Alternatively, the state of charge of the battery 5 may be determined from the electric current value for the purpose of controlling the amount of charge. Although the heat exchanger 10c includes a condenser that acts as a heat dissipator, the heat exchanger 10c may include an evaporator that has an expansion valve for adiabatically expanding the refrigerant and exchanges heat by vaporizing the refrigerant. The use of such a heat exchanger makes it possible to cool the temperature control fluid in the heating cycle unit 11. The temperature control fluid in the heating cycle unit 11 is cooling water for adjusting the temperature of the battery 5.

The heat exchanger 10c is generally formed of a heat dissipater that acts as the above-mentioned water refrigerant heat exchanger, which heats the temperature control fluid in the heating cycle unit 11 by using the temperature of a refrigerant. The temperatures of the temperature control fluid at the upstream and downstream ends of the heat exchanger 10c are measured by the temperature sensor TH, which is formed of a thermistor, and reported to the control unit 2. This makes it possible to control the degree by which the heat exchanger 10c increases the temperature.

The battery 5 is a high-voltage battery that is obtained by connecting a plurality of unit cells in series or in parallel within a housing. The battery 5 includes a temperature sensor (T-SNR) and a voltage sensor within the housing. The temperature sensor (T-SNR) measures the temperature of the battery 5. The battery 5 supplies electric power to electrical loads (LDs) 20 other than the motor generator 6, the refrigeration cycle unit 10, and the heating cycle unit 11. The electrical loads 20 include, for example, headlights.

An electric current sensor (I-SNR) 15 measures an electric current value for measuring the amount of charge in the battery 5 and the amount of discharge from the battery 5. A DC-to-DC converter (DC/DC) 16 supplies electric power having an appropriate power supply voltage to each electrical load.

An electric current flowing in the motor generator 6 is measured by the electric current sensor 15 and reported to the control unit 2. The control unit 2 uses the value of the electric current to determine the regenerative electric power derived from regenerative braking, regenerative braking motive force, and the like.

In accordance with a drive instruction from the control unit 2, the inverter 6v controls the running output of the vehicle. At the time of deceleration, the inverter 6v permits the motor generator 6 to generate regenerative electric power in order to charge the battery 5.

A display (DSP) 17 issues a warning to the driver in accordance with a command from the control unit 2. The display 17 is formed, for example, of a liquid-crystal display mounted on a meter panel.

In step S304 of FIG. 3, the display 17 is used to notify the driver of the possibility of canceling ongoing cruise control due to the impossibility of regenerative braking, that is, the possibility of the failure to derive necessary braking force from regenerative braking alone. The display 17 may also issue an audible message or sound a buzzer in order to notify the driver in advance of the possibility of canceling ongoing cruise control. This results in the cancellation of ongoing cruise control without the knowledge of the driver and makes it possible to avoid a problem such as unexpectedly approaching a preceding vehicle.

In step S201 of FIG. 2, the deviation between the current vehicle speed and the target vehicle speed is known because the current vehicle speed and the target vehicle speed are both obtained. Thus, it is possible to determine the power of the motor generator 6 that is required for eliminating the deviation. The control unit 2 accepts an input indicative of the amount of accelerator pedal depression, calculates the driving force requested by the driver, and acquires the accelerator-requested driving force Pa, which represents the request of the driver. Further, the control unit 2 accepts a cruise switch manipulation by the driver and determines in accordance with cruise execution conditions whether or not to issue an execution permit (step S202). If cruise execution is possible, the control unit 2 calculates the cruise-requested driving force Pc from the current vehicle speed and a vehicle speed setting (step S203). In step S204, arbitration is performed between the accelerator-requested driving force Pa and the cruise-requested driving force Pc to calculate the final driver-requested driving force.

The amount of accelerator pedal depression is a function of a force exercised to depress the accelerator pedal, and represents a total required braking force. A calculation is performed to determine a portion of the total required braking force that is to be provided by regenerative braking. This calculation is performed with a map by using, for example, the SOC of the battery, the deviation between the current vehicle speed and the target vehicle speed, the amount of accelerator pedal depression, and the deviation between the current temperature and ideal temperature of the battery as functions. Then, in step S206, the command value (execution torque) for the inverter is calculated from the calculated driving force.

The control unit 2 acquires battery information, including a voltage value, an electric current value, a battery temperature, and a temperature control fluid temperature, and calculates the SOC of the battery, which indicates the amount of remaining battery power.

When it is determined in step S302 that regenerative braking is to be applied, the various command values are calculated from the regenerative electric power, the current battery temperature, and the amount of remaining battery power SOC in accordance with the map exemplified in FIG. 4 (step S303).

Alternatively, input values from the temperature sensor TH, which is disposed at the inlet and outlet of the heat exchanger, can be used to accurately calculate the command values in such a manner as to detect and optimize the battery temperature. If the electric power to be consumed as needed to acquire the required braking force is not available, the display 17 notifies the driver of the possibility of canceling cruise control (step S304). This notification (cruise cancellation advance notice) is issued when cruising is in progress, the battery is fully charged, and adequate braking force is not derived from regenerative electric power, that is, issued to notify that the regenerative electric power is small, namely, acceleration is to take place.

If regenerative braking is to be applied, the command values are calculated in accordance with the battery temperature (step S305). If the battery temperature is optimized, the electric compressor 1c and the like are stopped to reduce the power consumption.

The command values for the cooling device 1 and the heating cycle unit 11 (heating device 11h) are determined by using the battery temperature and the amount of remaining battery power as parameters. If the amount of remaining battery power is not smaller than the fully charged SOC (TH-SOC), the operating mode switches from the normal mode to the energy consumption mode, thereby increasing the output to each device. The employed map is adapted to maintain the optimal temperature without wasting the battery power.

In the above-described embodiment, the regenerative braking apparatus for an electric vehicle includes the motor generator 6 and the inverter. The motor generator 6 drives the wheels 6T by using the electric power of the battery 5. The inverter uses the rotational energy of the wheels 6T to let the motor generator 6 generate electric power for the purpose of providing regenerative braking. The regenerative braking apparatus for an electric vehicle also includes the refrigeration cycle unit 10 and the heating cycle unit 11. The refrigeration cycle unit 10 compresses the refrigerant with the electric power of the battery to heat the heat exchanger 10c. The heating cycle unit 11 is a unit in which the medium heated by the heat exchanger 10c flows to heat the battery. The regenerative braking apparatus for an electric vehicle further includes the control unit 2. The control unit 2 controls the refrigeration cycle unit 10, the heating cycle unit 11, and the inverter 6v.

When the battery 5 is in a fully charged state in which the battery 5 cannot be charged with the regenerative electric power of the motor generator 6 or in a charged state close to the fully charged state, the control unit 2 forces the refrigeration cycle unit 10 and the heating cycle unit 11 to consume the electric power of the battery 5. Therefore, steps S303 and S305 of FIG. 3 are provided as the electric power consumption control section.

Consequently, the control unit 2 is provided with the electric power consumption control section which forces the refrigeration cycle unit 10 and the heating cycle unit 11 to consume the electric power of the battery 5 when the battery 5 is in the fully charged state in which the battery 5 cannot be charged with the regenerative electric power or in a charged state close to the fully charged state. As a result, the electric power can be precisely consumed to obtain the regenerative braking force without regard to environment or running status. This reduces the possibility of required regenerative braking being unavailable.

Next, steps S303 and S305, which implement the electric power consumption control section, are performed to switch the control of the refrigeration cycle unit 10 and heating cycle unit 11 between the normal mode and the energy consumption mode in accordance with the charged state of the battery 5 for the purpose of acquiring the braking force derived from regenerative braking. In the normal mode, the regenerative electric power is used to preferentially charge the battery 5 and properly manage the battery temperature. In the energy consumption mode, the refrigeration cycle unit 10 and the heating cycle unit 11 are forced to consume the electric power of the battery 5 in a predetermined pattern. This enables the battery 5 to apply regenerative braking.

As described above, the control of the refrigeration cycle unit 10 and heating cycle unit 11 is switched between the normal mode and the energy consumption mode in accordance with the charged state of the battery 5. Thus, when the battery 5 is not fully charged and is able to apply regular regenerative braking, it is possible to execute the normal mode, which charges the battery 5 with the regenerative electric power and properly maintains the temperature of the battery 5. When, on the other hand, the battery 5 is fully charged and unable to apply regenerative braking, it is possible to switch to the energy consumption mode, permit the electric power of the battery 5 to be consumed in the predetermined pattern, and enable the battery 5 to apply regenerative braking.

Next, when the battery 5 is in the fully charged state in which the battery 5 cannot be charged with the regenerative electric power or in a charged state close to the fully charged state, the control unit 2 forces electrical loads 20 (see FIG. 1) other than the refrigeration cycle unit 10 and the heating cycle unit 11 to consume the electric power of the battery 5. Consequently, when the battery 5 cannot be charged with the regenerative electric power, electrical loads 20 other than the refrigeration cycle unit 10 and the heating cycle unit 11 are forced to consume the electric power of the battery 5. This makes it possible to apply regenerative braking with increased certainty.

Further, the refrigeration cycle unit 10 includes the heat exchanger 10c that dissipates the heat of the refrigerant compressed by the compressor 1c. The heating cycle unit 11 is configured so that the heat exchanger 10c adjusts the temperature of the medium flowing in the battery 5. The control unit 2 then controls the temperature of the battery 5 by using the temperature sensor that measures the temperature of the medium. Consequently, the temperature of the battery 5 can be accurately controlled to prevent the battery 5 from degrading and lowering its output.

Moreover, the control unit 2 sounds or displays a warning to the user when the refrigeration cycle unit 10, the heating cycle unit 11, and other electrical loads 20 cannot be forced to sufficiently consume the electric power of the battery 5. Consequently, if the refrigeration cycle unit 10, the heating cycle unit 11, and other electrical loads 20 cannot be forced to sufficiently consume the electric power of the battery 5, the control unit 2 sounds or displays a warning. Therefore, the user of the vehicle can be notified of a state where regenerative braking will not be applied.

The electric vehicle includes a cruise control unit that cancels constant-speed running control when the mechanical brake is operated by the driver of the vehicle.

Consequently, the cruise control unit is available to cancel constant-speed running control when the mechanical brake is operated by the driver of the vehicle. Thus, regenerative braking can be applied wherever possible. Therefore, automatic cancellation of cruise control can be avoided wherever possible.

Other Embodiments

The foregoing embodiment has been described as a preferred embodiment. However, the present disclosure described in this specification is not limited to the above-described embodiment. The above-described embodiment may be variously modified without departing from the spirit of the present disclosure. The structure of the above-described embodiment is merely an example. The scope of the present disclosure is not limited to the scope indicated by the description of the foregoing embodiment. The scope of the present disclosure is defined by the appended claims. Further, it should be understood by those skilled in the art that various modifications and alterations may occur as far as they are within the scope of the appended claims or the equivalents thereof.

For example, when the battery is fully charged and unable to absorb the regenerative electric power, electrical loads 20 other than the refrigeration cycle unit 10 and the heating cycle unit 11, such as headlights and a thermoelectric conversion element similar to the one described in Patent Document 1, may be allowed to consume the electric power. This causes additional consumption of electric power. The headlights are illuminated at a timing that does not give the user a feeling of strangeness. Further, when required regenerative braking force is not obtained, the control unit 2 may output a control signal so that a friction brake is applied by an electric brake control unit, which is one of the other electrical loads 20. This makes it possible to automatically obtain braking force that is required when regenerative braking cannot be applied.

When the value of the SOC for determining the fully charged state is varied with the life of the battery 5, it is possible to properly determine whether the battery 5 is fully charged even when it is aged.

What is claimed is:

1. A regenerative braking apparatus for an electric vehicle, comprising:
   a motor generator that drives wheels using electric power of a battery;
   an inverter that drives the motor generator and uses rotational energy of the wheels to let the motor generator generate electric power for a purpose of providing regenerative braking;

a refrigeration cycle unit that compresses a refrigerant with the electric power of the battery in order to heat a heat exchanger;

a heating cycle unit that is a unit in which a medium heated by the heat exchanger flows to heat the battery; and a control unit that controls the refrigeration cycle unit, the heating cycle unit, and the inverter, wherein the control unit includes an electric power consumption control section which forces the refrigeration cycle unit and the heating cycle unit to consume the electric power of the battery in a situation where the battery cannot be charged with regenerative electric power of the motor generator.

2. The regenerative braking apparatus for an electric vehicle according to claim 1, wherein the electric power consumption control section switches control of the refrigeration cycle unit and of the heating cycle unit between a normal mode and an energy consumption mode in accordance with a charged state of the battery for a purpose of acquiring a braking force derived from regenerative braking, and wherein in the normal mode, the regenerative electric power of the motor generator is used to charge the battery and properly adjust a temperature of the battery, and wherein in the energy consumption mode, the refrigeration cycle unit and the heating cycle unit are forced to consume the electric power of the battery in a predetermined pattern for a purpose of placing the battery in a non-fully charged state where regenerative braking can be applied.

3. The regenerative braking apparatus for an electric vehicle according to claim 1, wherein when the battery cannot be charged with the regenerative electric power of the motor generator, the control unit forces electrical loads other than the refrigeration cycle unit and the heating cycle unit to consume the electric power of the battery in a predetermined pattern.

4. The regenerative braking apparatus for an electric vehicle according to claim 1, wherein a temperature of the medium flowing in the battery is adjusted by the heat exchanger, and wherein the control unit detects a temperature of the battery by using a temperature sensor for measuring the temperature of the medium, and controls the temperature of the medium.

5. The regenerative braking apparatus for an electric vehicle according to claim 1, wherein the control unit sounds or displays a warning to a user when the refrigeration cycle unit, the heating cycle unit, and electrical loads other than the refrigeration cycle unit and the heating cycle unit cannot be forced to sufficiently consume the electric power of the battery.

6. The regenerative braking apparatus for an electric vehicle according to claim 1, further comprising:

a cruise control unit that cancels a constant-speed running control when a mechanical brake is operated by a driver of the electric vehicle.

7. The regenerative braking apparatus for an electric vehicle according to claim 1, wherein when a required regenerative braking force is not obtained, the control unit instructs an electric brake control unit to apply a friction brake, the electric brake control unit being an electrical load other than the refrigeration cycle unit and the heating cycle unit.

* * * * *